(12) United States Patent
Enright et al.

(10) Patent No.: US 9,785,758 B1
(45) Date of Patent: *Oct. 10, 2017

(54) USER CONTENT ACCESS MANAGEMENT AND CONTROL

(71) Applicant: GOOGLE INC., Mountain View, CA (US)

(72) Inventors: Keith Enright, San Francisco, CA (US); Stephan Micklitz, Sauerlach (DE); Andreas Michael Tuerk, Woerthsee (DE); Sara Adams, Munich (DE); Peter Dickman, Zurich (CH); Andrew Swerdlow, San Francisco, CA (US); Dan Fredinburg, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/133,542

(22) Filed: Apr. 20, 2016

Related U.S. Application Data

(63) Continuation of application No. 13/844,435, filed on Mar. 15, 2013, now Pat. No. 9,350,599.

(60) Provisional application No. 61/664,576, filed on Jun. 26, 2012.

(51) Int. Cl.
*G06F 15/16* (2006.01)
*G06F 21/10* (2013.01)
*H04L 29/06* (2006.01)

(52) U.S. Cl.
CPC ............ *G06F 21/10* (2013.01); *H04L 63/102* (2013.01); *H04L 63/20* (2013.01)

(58) Field of Classification Search
CPC ......... H04L 43/10; H04L 63/10; H04L 47/70; G06F 13/10; G06F 21/50; G06F 21/577; G06F 2201/86; G06F 15/16
USPC .......................................... 709/225; 370/235
See application file for complete search history.

(56) References Cited

U.S. PATENT DOCUMENTS

| | | | | |
|---|---|---|---|---|
| 2002/0071390 A1* | 6/2002 | Reeves | .............. | H04Q 11/0478 370/235 |
| 2002/0142846 A1* | 10/2002 | Paulsen | .............. | G06Q 30/0209 463/43 |
| 2003/0050917 A1* | 3/2003 | Charron | ................. | G06Q 10/10 |
| 2004/0056202 A1* | 3/2004 | Rao | ......................... | G04F 10/10 250/369 |
| 2005/0033653 A1* | 2/2005 | Eisenberg | .............. | G06Q 20/12 705/26.8 |

(Continued)

OTHER PUBLICATIONS

Number of active users at Facebook over the years. Associated Press, Oct. 23, 2012.

(Continued)

*Primary Examiner* — Tesfay Yohannes
(74) *Attorney, Agent, or Firm* — Procopio, Cory, Hargreaves & Savitch LLP

(57) ABSTRACT

User content access management and control are described, including determining, based on a user-defined rule, that a triggering event has occurred, wherein the user-defined rule is associated with an account that belongs to the user, and the user-defined rule comprises an action to be performed based on a triggering event; and performing the action based on the triggering event, wherein the action affects access to the account.

17 Claims, 18 Drawing Sheets

(56) References Cited

U.S. PATENT DOCUMENTS

| | | | | |
|---|---|---|---|---|
| 2007/0043657 | A1* | 2/2007 | Koenigsman | G06Q 40/00 705/38 |
| 2008/0263643 | A1* | 10/2008 | Jaiswal | G06F 21/31 726/6 |
| 2011/0010219 | A1* | 1/2011 | Stearns | G06Q 10/06 705/7.27 |
| 2013/0133048 | A1* | 5/2013 | Wyn-Harris | H04L 63/0861 726/5 |
| 2013/0173474 | A1* | 7/2013 | Ranganathan | G06Q 20/0655 705/67 |
| 2013/0254001 | A1* | 9/2013 | Acar | G06Q 30/06 705/14.23 |

OTHER PUBLICATIONS

Brubaker, J. R., et al. Beyond the Grave: Facebook as a site for the expansion of death and mourning. The Information Society.

Brubaker, J. R. et al. Grief-Sticken in a Crowd: The language of bereavement and distress in social media. Proc. ICWSM-12. Dublin, Ireland. Jun. 4-8, 2012.

Brubaker, J. R. et al. "We will never forget you [on-line]": An empirical investigation of post-mortem MySpace comments. In Proceedings of the ACM 2011 conference on Computer supported cooperative work (CSCW '11), 123-132.

CIA Factbook. https://www.cia.gov/library/publications/the-world-factbook/geos/xx.html.

Goodin, Dan (Oct. 8, 2008). "Son of state lawmaker charged with Palin email hack". The Register. Retrieved Oct. 10, 2008.

Graves, K. 2009. Social Networking Sites and Grief: An Exploratory Investigation of Potential Benefits. Dissertation at the University of Indiana at Pennsylvania.

IndexMundi. http://www.indexmundi.com.

S. Fox and M. Duggan. Tracking for Health. Jan. 28, 2011 http://www.pewinternet.org/Reports/2013/Tracking-for-health/Summary-of-findings.aspx.

Sundar Pichai. Jun. 28, 2010. Chrome & Apps at Google I/O: Your web, everywhere. Official Google Blog.

* cited by examiner

1400

Data Retrieval

Download a copy of John Smith's WXYZ data in zip-files. Download times can vary dependent on connection speed and file sizes. Learn how to unpack zip-files.

| 1410<br>WXYZ Products | 1420<br>Download link | |
|---|---|---|
| Calendar - Less than 0.1 GB | Download data | ⎫ |
| Docs - 0.4 GB | Download data | |
| Email 0.3GB | Download data | |
| Search - 0.2 GB | Download data | |
| Account data 0.1 GB | Download data | |
| Docs - 0.4 GB | Download data | ⎬ 1430 |
| Email 0.3GB | Download data | |
| Search - 0.2 GB | Download data | |
| Video 9.3GB - Multi-file download | Download data 01 | |
| | Download data 02 | |
| | Download data 03 | |
| | Download data 04 | |
| | Download data 05 | |
| | Download data 06 | |
| | Download data 07 | ⎭ |

Fig. 14

USER CONTENT ACCESS MANAGEMENT AND CONTROL

CROSS-REFERENCE TO RELATED APPLICATIONS

This application is a non-provisional of U.S. Provisional Patent Application No. 61/664,576, filed Jun. 26, 2012, and U.S. patent application Ser. No. 13/844,435, filed Mar. 15, 2013, the entire contents of which are incorporated herein in their entirety by reference.

BACKGROUND

Technology Field

The subject matter described herein relates generally to online services and, more particularly, to user content access management and control of user information residing in computer software.

Background Information

Online services are becoming more prevalent. Users of very young ages to very old ages are communicating with each other using one or more online services, as well as storing information and data online (e.g., storing and backing up data, sharing images and videos, etc.).

After online services are first used, however, users do not always continue to access the services. For example, a user may abandon or stop using one image sharing site and start using another image sharing site. A user may stop using a college-focused service after graduation from college. A user may die or be incapacitated and cease accessing online services.

When users stop accessing their online services, there is a need to determine what should happen to their accounts and data stored within those services. Some users may not want their accounts and the associated data to be wiped out or deleted after, they die, for example. A user (e.g., User A) may share his or her login information (i.e., user names and passwords) with another user (e.g., User B) to manage his or her accounts and/or data in this instance. However, User A may not trust User B enough to hand over login information to all of User A's accounts (e.g., User A's image sharing account may include images not meant to be viewed by User B). User B may also turn out to be not as reliable or trustworthy as expected after gaining access to User A's accounts.

SUMMARY

One aspect of the present application may include a computer-implemented method to enable a user to control access to user information, comprising determining, based on the user-defined rule, that a triggering event has occurred, wherein the user-defined rule is associated with an account that belongs to the user, and the user-defined rule comprises an action to be performed based on the triggering event, and performing the action based on the triggering event, wherein the action affects access to the account.

Another aspect of the present application may include a computer-implemented method to enable a user to control access to user information, comprising receiving a rule from the user having access to an account that contains content of the user, wherein the rule defines a first triggering event associated with a first action and a second triggering event associated with a second action, performing the first action based on a first determination that the first triggering event has occurred, and performing the second action based on a second determination that the first triggering event and the second triggering event have occurred.

Another aspect of the present application may include a non-transitory computer readable medium having stored therein computer executable instructions for receiving a rule from a user having access to an account that contains content of the user, wherein the rule defines a first triggering event associated with a first action and a second triggering event associated with a second action, performing the first action based on a first determination that the first triggering event has occurred, and performing the second action based on a second determination that the first triggering event and the second triggering event have occurred.

Another aspect of the present application may include at least one computing device comprising storage and at least one processor configured to receive a rule from a user having access to an account that contains content of the user, wherein the rule defines a first triggering event associated with a first action and a second triggering event associated with a second action, perform the first action based on a first determination that the first triggering event has occurred, and perform the second action based on a second determination that the first triggering event and the second triggering event have occurred.

Another aspect of the present application may include a computer-implemented method to enable a user to control access to user information, comprising maintaining an account, the account being accessible by the user, and storing a user identifier in storage, performing a first determination by a processor that a difference between a current time and a recent user access time of the account exceeds a threshold value, performing a second determination by the processor that the stored user identifier matches a third-party database entry, and performing an action by the processor, based on the first determination and the second determination, the action comprising at least one of restricting access to the account and determining a status of the user.

Another aspect of the present application may include a non-transitory computer readable medium having stored therein computer executable instructions for maintaining an account, the account being accessible by a user, and storing a user identifier in a storage, performing a first determination by a processor that a difference between a current time and a recent user access time of the account exceeds a threshold value, performing a second determination by the processor that the stored user identifier matches a third-party database entry, and performing an action by the processor, based on the first determination and the second determination, the action comprising at least one of restricting access to the account and determining a status of the user.

Another aspect of the present application may include at least one computing device collectively having storage and at least one processor, comprising a first determining unit that performs a first determination that a difference between a current time and a recent user access time of an account exceeds a threshold value, the account being accessible by a user, a second determining unit that performs a second determination that a user identifier stored in the storage matches a third-party database entry, and an action unit that, based on the first determination and the second determination, performs an action comprising at least one of restricting access to the account and determining a status of the user.

BRIEF DESCRIPTION OF THE DRAWINGS

FIGS. 8-14 illustrate a third user interface that may be used to verify a trusted contact after a triggering event has occurred and a specified duration of time have elapsed according to an example implementation.

DETAILED DESCRIPTION

Figure 1:
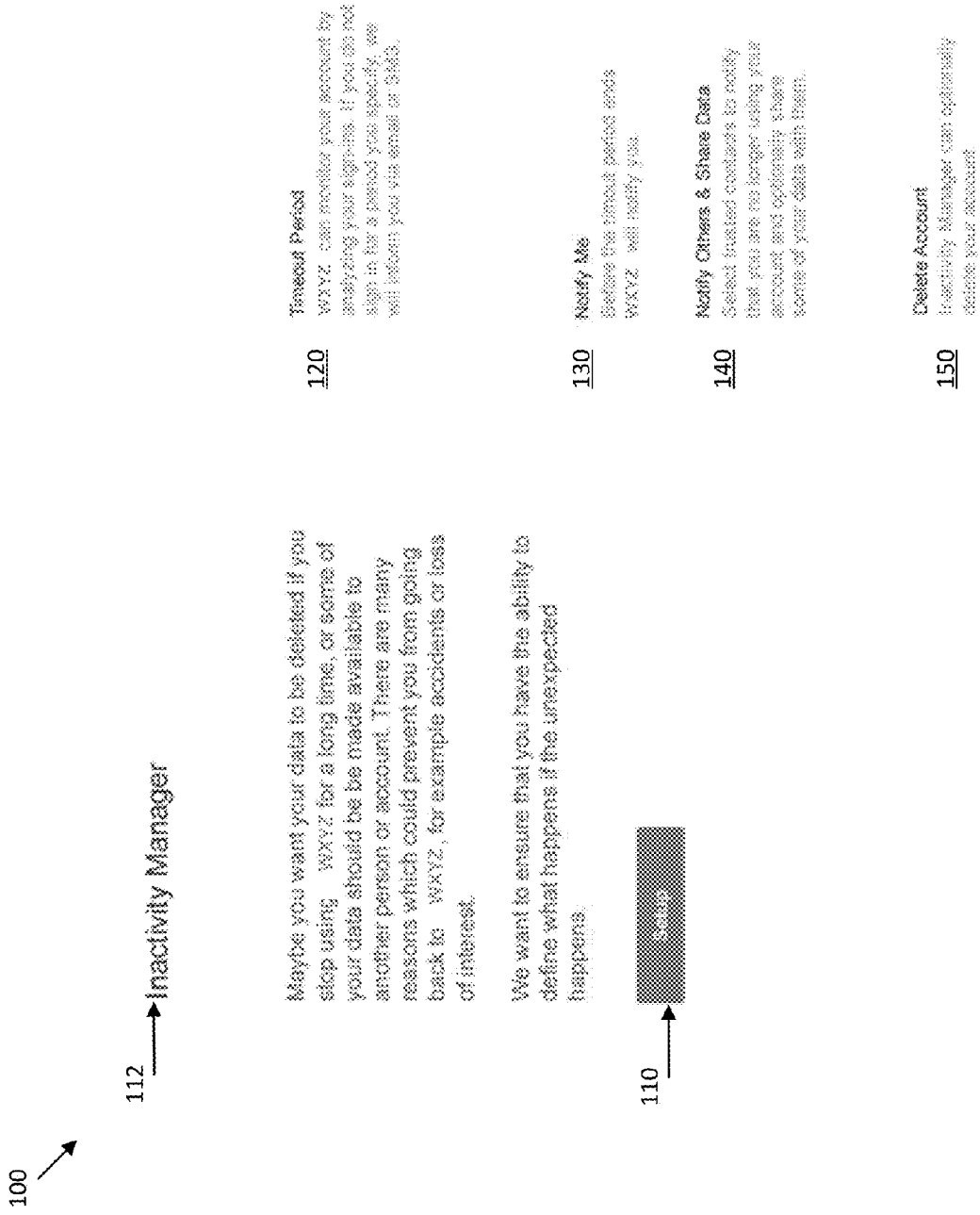
FIG. 1 illustrates a first user interface according to an example implementation.

The subject matter described herein is taught by way of example implementations. Various details have been omitted for the sake of clarity and to avoid obscuring the subject matter. Examples shown below are directed to structures and functions for implementing user content access management and control.

Service providers may detect inactive service accounts and take or perform actions on these accounts. In some example implementations, service providers may perform data hygiene and/or clean up accounts of, for example, users who are deceased.

Accounts and/or data may be shared or access given to one or more other users. For example, a mechanism may be implemented to allow User A to specify that User B is given permission and/or ownership to access User A's account and/or data under one or more conditions (e.g., User A's account has been inactive for a specified period and/or User A has died). In some example implementations, User A may define different or additional actions to be taken or performed associated with the conditions or triggering events.

In some example implementations, a mechanism may be implemented to allow User A to specify that User C is prevented from (i.e., not allowed) accessing User A's accounts and/or data under one or more conditions. User C may or may not have access to User A's accounts when the preventive action is instituted.

In some example implementations, users may be given the ability to define a set of rules to manage their accounts and/or the associated data or content (may collectively be referred to as "accounts"). For example, one or more rules may include one or more triggering events, each of which may include one or more associated actions associated with an account.

Example of actions may include, but are not limited to, account deletion, content transfer, password resets, and the like. For example, accounts may be identified for "clean up" or other actions using epitaphs or eulogies.

A user may specify a set of rules including associated triggering events and/or associated actions to indicate how the user's accounts may be managed. The rules may be specified as successive rules (i.e., applying rule 1, then rule 2, then rule 3, etc.). For example, the user can specify:

Rule 1 with Condition 1: If I have not logged in for more than 3 months and/or used any of services A, B, and C:
Action 1 associated with Condition 1: Email me at my alternate email address user1_at_myotheremail.com.
Rule 2 with Condition 2: If a defined link in a defined email does not get clicked:
Action 2 associated with Condition 2: Delete all of my documents with label LABEL1.
Action 3 associated with Condition 2: Set User B as new owner for all my documents.
Action 4 associated with Condition 2: Deactivate and delete my account.

With each rule, a user can specify a plurality of conditions and actions, as well as arrange order in which the conditions and actions may occur. Further, a user can also group a plurality of different conditions with a plurality of different actions. In some example implementations, a service provider or its system may suggest some common set of rules. A user may use the suggested rules as defaults and/or a starting point to customize the user-specific rules, triggering events, and/or actions.

A service provider may be any entity that stores user accounts and/or data or is likely implementing similar services. For example, cloud based service providers (e.g., providing computing and/or storage) may implement at least some of the example implementations described herein to manage service demand or allow users to control their accounts and content.

As used herein, the terms "account," "data" associated with an account, or "content" associated with an account refer to information and data of or about the user, related to or associated with the user, generated by or for the user, and/or for communicating with or providing service to the user. An account and/or data or content associated with the account may be associated with a website, product, service, online service, or application. The term "application" includes, but is not limited to, software (e.g., a non-transitory computer readable medium having instructions executable by a processor), which is online (e.g., accessible by communication protocol and structure, such as the Internet or other communication network). The application may be embodied in the structure described below with respect to FIG. 19 below.

As used herein, the term "website" or "web site" or "site" refers to a set of web pages for providing or supporting related services. A website can be hosted on at least one computing device (e.g., a system, server, web server, application server, client, or any label) accessible via a network or connection (wired and/or wireless). A website can be accessed and/or supported using at least one top-level Uniform Resource Locator (URL, e.g., "abc.gov," "123.org," "zxc.com," "bestads.com," "virtualbank.com," and the like). A website can be operated and/or supported by one or more business entities. For example, ZXC Corporation may operate the website "zxc.com" that includes web pages, content, and/or services from "zxc.bestads.com" (e.g., advertisement services provided by another firm) and "virtualbank.com/zxc-payment-services" (e.g., financial services provided by a financial institution).

As used herein, the terms "product," "service," "online service," or "application" refer to any information, communication, infrastructure, organization, or the like provided by one or more providers to at least one user. Examples of products, services, or applications may include, but are not limited to, forums, online platforms, bulletin boards, social networks, websites, sites, chat rooms, email communication, image sharing sites, data sharing platforms, video sharing sites, online searching, data storage, cloud storage, software, tax preparation and filing, online banking, online investment management, and the like. Products, services, or applications may be provided on any device ranging from a mobile device (e.g., smartphone application or "apps"), to a semi-mobile device (e.g., a laptop), and to a non-mobile device (e.g., a kiosk). A product, service, or application may communicate to a provider or another product, service, or application using a wired or wireless connection.

FIG. 1 illustrates a first user interface according to an example implementation. User interface (UI) 100 is used to illustrate a mechanism for a user to define one or more rules; each rule may include one or more associated triggering events and/or one or more associated actions. Specifically, UI 100 provides a control 110 for activating a second user interface shown in FIGS. 2-7 discussed below for defining or adjusting the individual the conditions and actions of the rule. A rule may be given a name (not shown), and a user may define one or more additional rules (not shown). Alternatively, the rule name may be defined by the service provider. In the example implementation shown in FIG. 1, the rule name 112 has been predefined by the service provider.

UI 100 also provides a display or summary of the defined conditions 120 and actions 130, 140, 150. Specifically, in this implementation condition 120 provides that the service provider ("WXYZ") will monitor user sign-in of the account and if a sign-in does not occur for a specified period of time ("time-out period"). Action 130 provides for the service provider WXYZ to notify the user if the account is not signed into during the specified timeout period. Action 140 provides for the service provider WXYZ to notify a different user ("trusted contacts") if service provider WXYZ does not receive a response to the notification in Action 130. Additionally, action 140 also provides for the transfer of account data to the trusted contact. Further, action 150 provides for the deletion of the account.

FIGS. 2-7 illustrates a second user interface (UI) 200 provided for defining the conditions 120 and actions 130, 140, 150 of a rule defined by a user. The UI 200 may be accessed using the control 110 provided by UI 100 shown in FIG. 1. The like of UI 200 may be activated to define or revise the conditions 120 and actions 130, 140, 150. UI 200 and the like may be used for any topic or type of user actions such as probate planning, estate planning, account planning, account and/or user information inheritance, contingency planning, other type of account management and/or control, etc. However, the example implementation is not limited thereto, and other topics or types of user actions may be substituted therefor, as would be understood by one skilled in the art.

Figure 2:
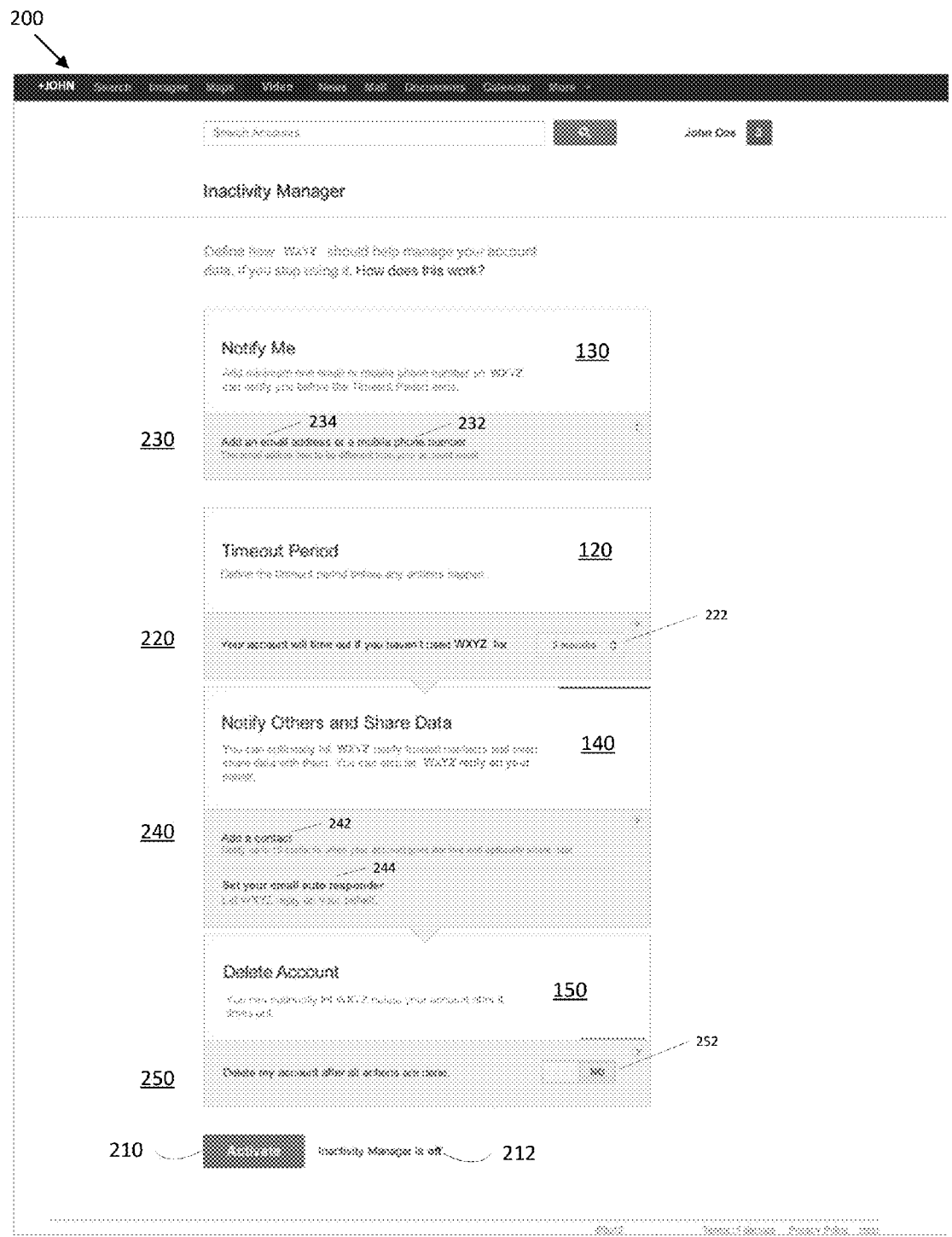
FIGS. 2-7 illustrate a second user interface provided for defining the conditions and actions of a rule defined by a user according to an example implementation.
Figure 3:
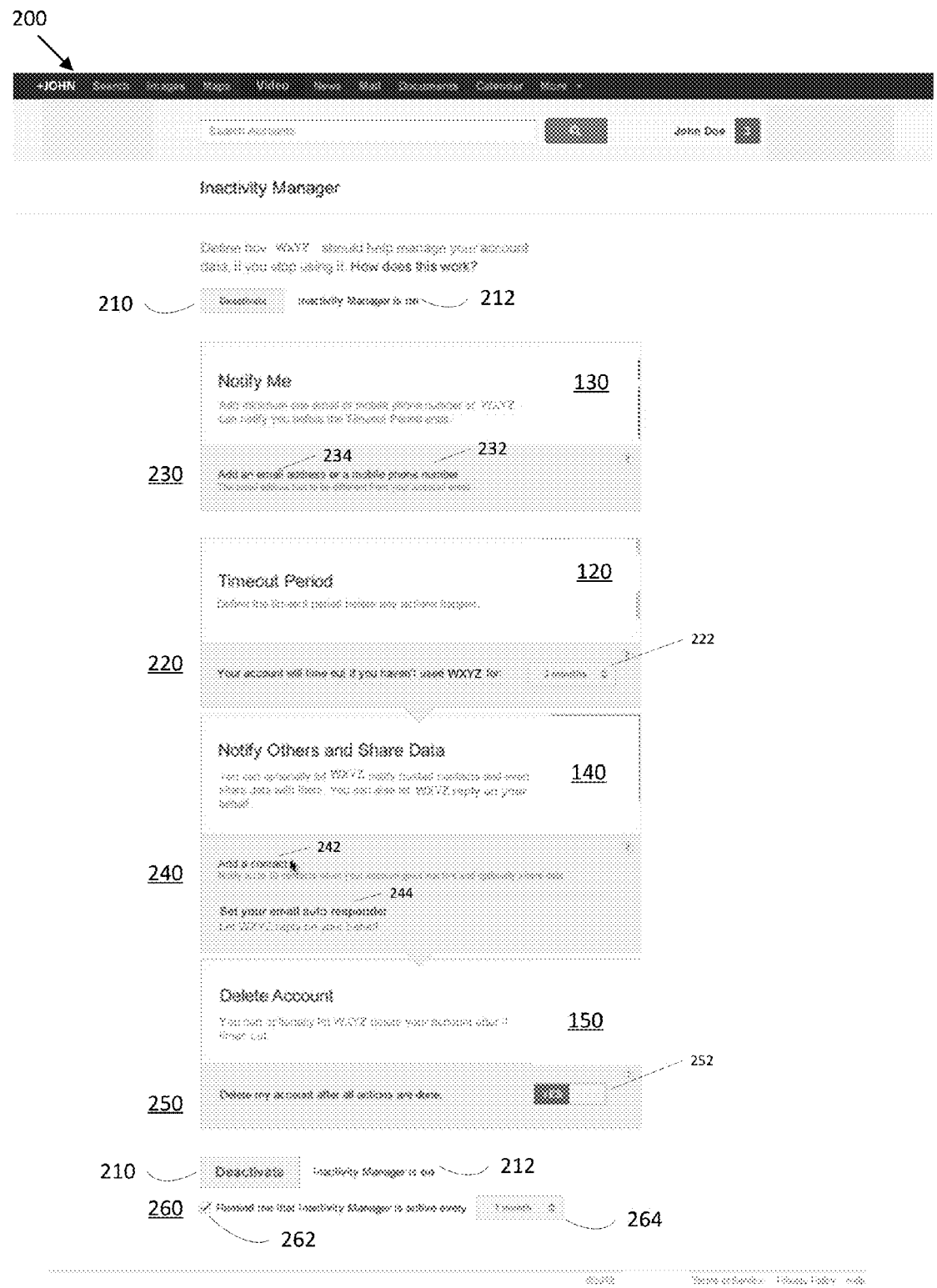

UI 200 includes controls 210 to turn on or off the effects of the settings in UI 200 and an indicator 212 indicating whether the effects of the settings in UI 200 are turned on or off. FIG. 2 illustrates the UI 200 in a turned off state. FIG. 3 illustrates the UI in a turned on state. Additionally, a control to pause application of the rule to, for example, suspend the operation of the functionality of this example implementation may also be provided in some implementations. UI 200 displays the conditions 120 and actions 130, 140, 150 of the user defined rule that were shown in UI 100. Additionally, UI 200 provides an inactivity section ("timeout period") 220, a warning section ("Notify me") 230, an action section ("Notify Others and Share Data") 240, and a final action sections ("Delete Account) 250 that allow for editing and defining the condition 120 and actions 130, 140, 150 of the defined rule. The UI 200 may also include a reminder control section 260 (not shown in FIG. 2, shown in FIGS. 3-7). Additionally, in some implementations, the UI 200 may also provide additional sections or controls such a save control to save the settings of UI 200, and a reset control, for example.

Inactivity section 220 includes, for example, a control 222 for specifying duration (e.g., "3 Months" from last sign-in) for a triggering event. In UI 200, the triggering event is implemented as being automatic based on last login by the user. However, implementations are not limited to this implementation and one or more other triggering events may be specified or used, such as receiving a notification of a change of status from a third party or a predefined code given to or created by the user for triggering purposes, etc. A change of status may include, for example, a report of death or disablement or incarceration from a government agency or from a person having a predefined relationship to the user. Additionally, UI 200 may also include a control for defining how an account as inactive.

Warning section 230 includes controls 232, 234 to allow a user to specify one or more manners to receive a warning, including email and short message service (SMS), prior to the expiration of the duration specified by the control 222. Additionally, in some implementations, a control may be provided to specify duration from the triggering event for a user to receive a warning (e.g., "2 Months" before action is taken by the service provider).

Action section 240 includes a control 242, 244 for allowing a user to specify actions to be taken when the duration defined in control 222 from the triggering event has elapsed (e.g. "3 months" from last sign-in). Specifically, in this implementation, control 242 allows a user to identify contacts (known as "trusted contacts") to be contacted and allowed to transfer or download account data specified by the user using the control 242. As discussed below, the transfer or download of account data can also involve authentication of the trusted user prior to transfer of the data. Additionally, control 244 allows a user to prepare a reply to allow the service provider to reply to further communications received by the account. However, actions defined by a user are not limited to these example implementations. Other example actions may include, but are not limited to, sending an SMS, sending a voice message, locking an account, transferring an account, and the like. In some example implementations, the duration may be used differently. Additionally, in some implementations a control 142 for specifying a grace period duration (e.g., 2 Weeks), which may be implemented from when duration defined in control 22 from the triggering event has elapsed.

Final action section 250 includes a control 252 to allow a user to specify, for example, one or more additional actions (e.g., a "Final Action"). For example, a user may specify that his or her accounts be deleted after the triggered action specified in action section 240 has occurred.

The reminder section 260 could be provided that includes a control 262 to allow a user to specify that the user wants to receive remainder communications (emails, SMS messages, voicemails, etc.) regarding the settings of UI 100 and UI 200. The reminder section could also include control 264 to allow a user to specify the frequency of the reminder. In some example implementations, UI 100 and UI 200 may include different, more, or less features than shown (i.e., a rule may include different, more, or less triggering events and/or actions).

Figure 4:
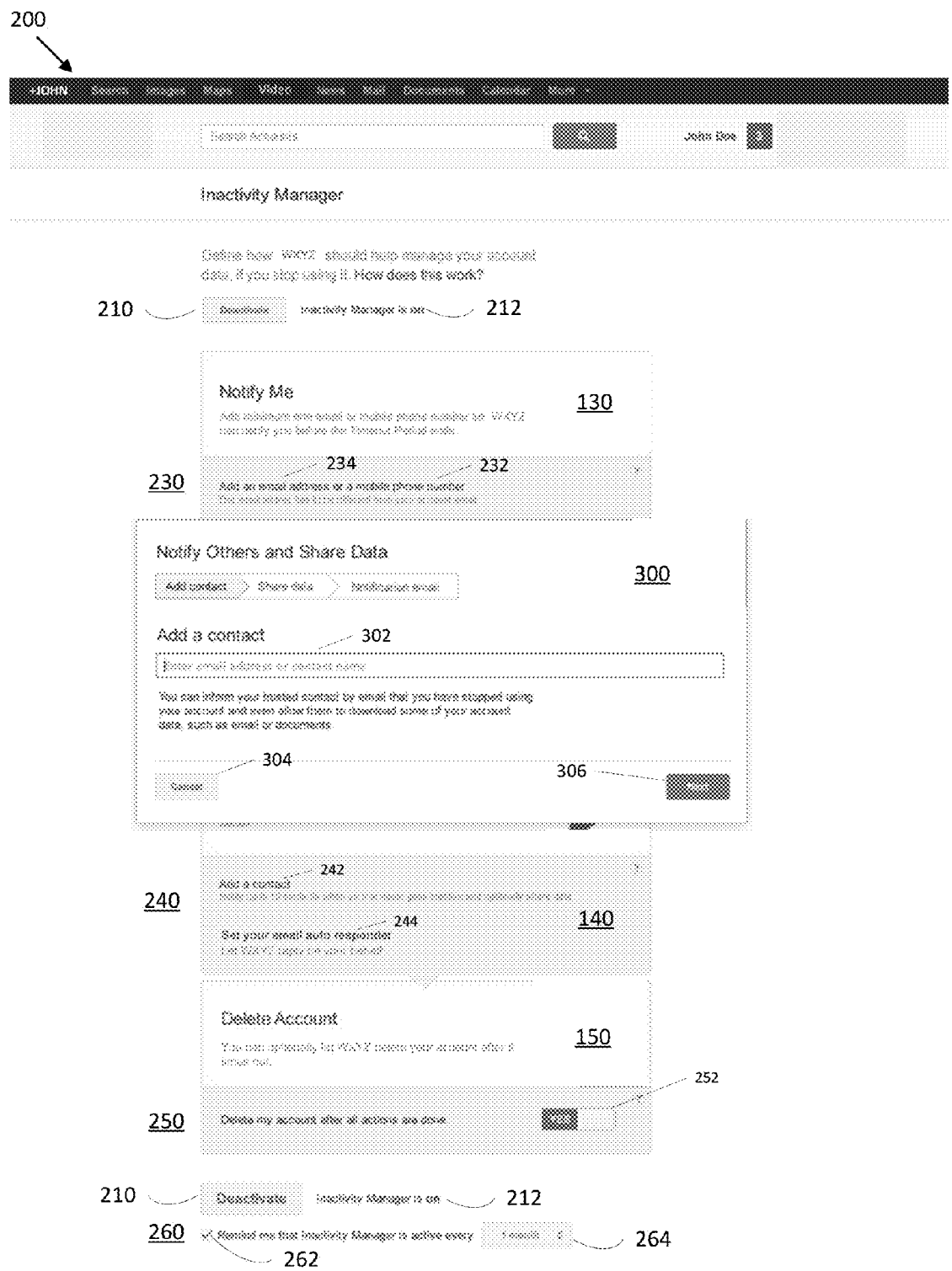

FIG. 4 illustrates the user interface 200 according to the example implementation with control 242 activated indicating that a contact will be identified as a trusted contact to be notified that the account is not being accessed by the user. By activating the control 242, a User Interface UI 300 may be displayed for entry of the "trusted contact" information. UI 300 includes an entry field 302 to allow a user to enter one or more email addresses or contact names to be identified as "trusted contacts". Additionally, UI 300 also includes a control 304 to allow a user to cancel the identification of contacts as "trusted contacts" and a control 306 to allow submission of the "trusted contact" information and proceed to a screen for identifying what data should be shared with the identified "trusted contact".

Figure 5:
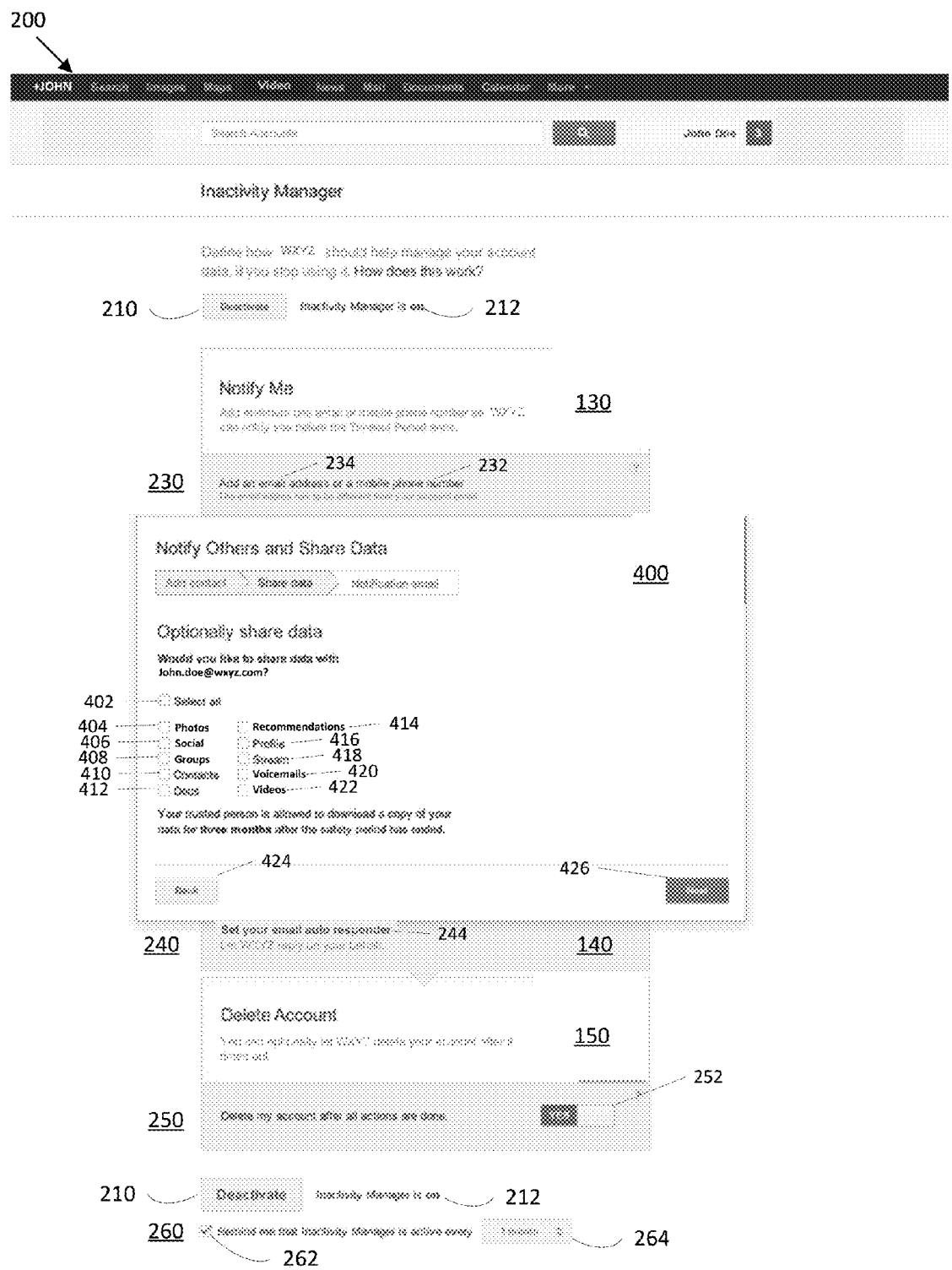

FIG. 5 illustrates the user interface 200 according to the example implementation with control 242 activated, a trusted contact has been identified, and document data is to be identified for transfer. After control 306 of UI 300 has been used to submit the "trusted contact" information has been submitted, User Interface UI 400 may be displayed for identifying what data should be shared with the identified "trusted contact". UI 400 includes a plurality of controls 402-422 for identifying account data to be shared to the "trusted contact". Examples of account data could include recommendations data, social media data, group's data, contact data, document data, photo data, profile data, stream data, voicemail data, and video data, or any other type of data that might be apparent to a person of ordinary skill in the art. Additionally, control 424 may be provided to allow a user to return to UI 300 and control 426 may be provided to allow a user to submit the selections of data.

Figure 6:
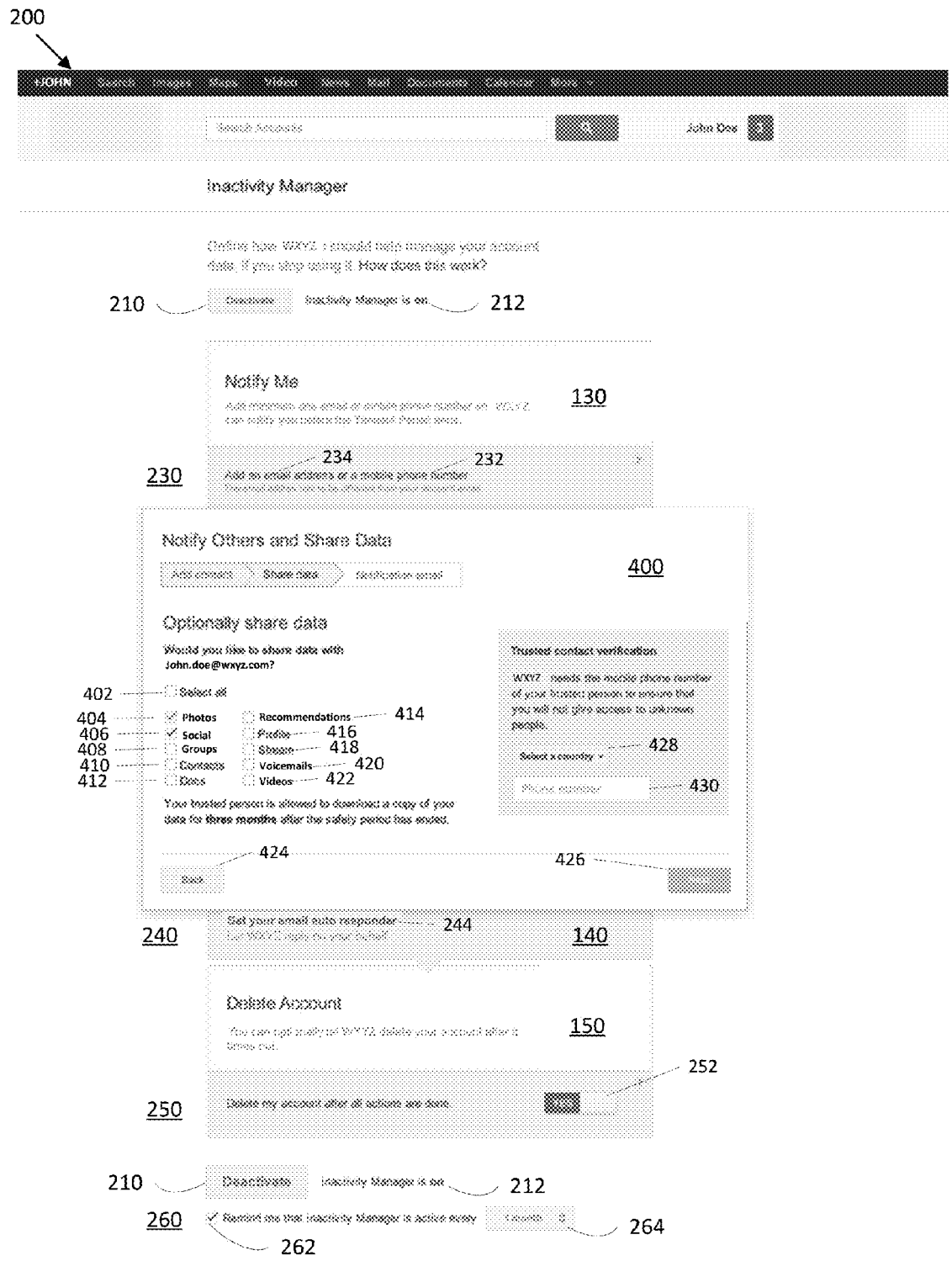

FIG. 6 illustrates the user interface 200 according to the example implementation with control 242 activated, a trusted contact has been identified, and document data has been identified for transfer. In FIG. 6 at least one of the controls 402-422 have been selected indicating that account data is to be shared with the "trusted contact". In some implementations, if one of the controls 402-422 have been used to identify account data for sharing with the trusted contact, controls 428, 430 may be provided to allow the user to provide a verification contact, different from the contact provided in entry field 302, to be used to authenticate the trusted user prior to sharing (authentication is discussed in more detail below). For example, control 428 may allow a user to identify a country location of the "trusted contact" and control 430 may allow a user to enter a contact phone number that can be used to authenticate the "trusted contact". Other examples of verification contacts include alternative email addresses, addresses, or other contact information that would be apparent to a person of ordinary skill in the art.

Figure 7:
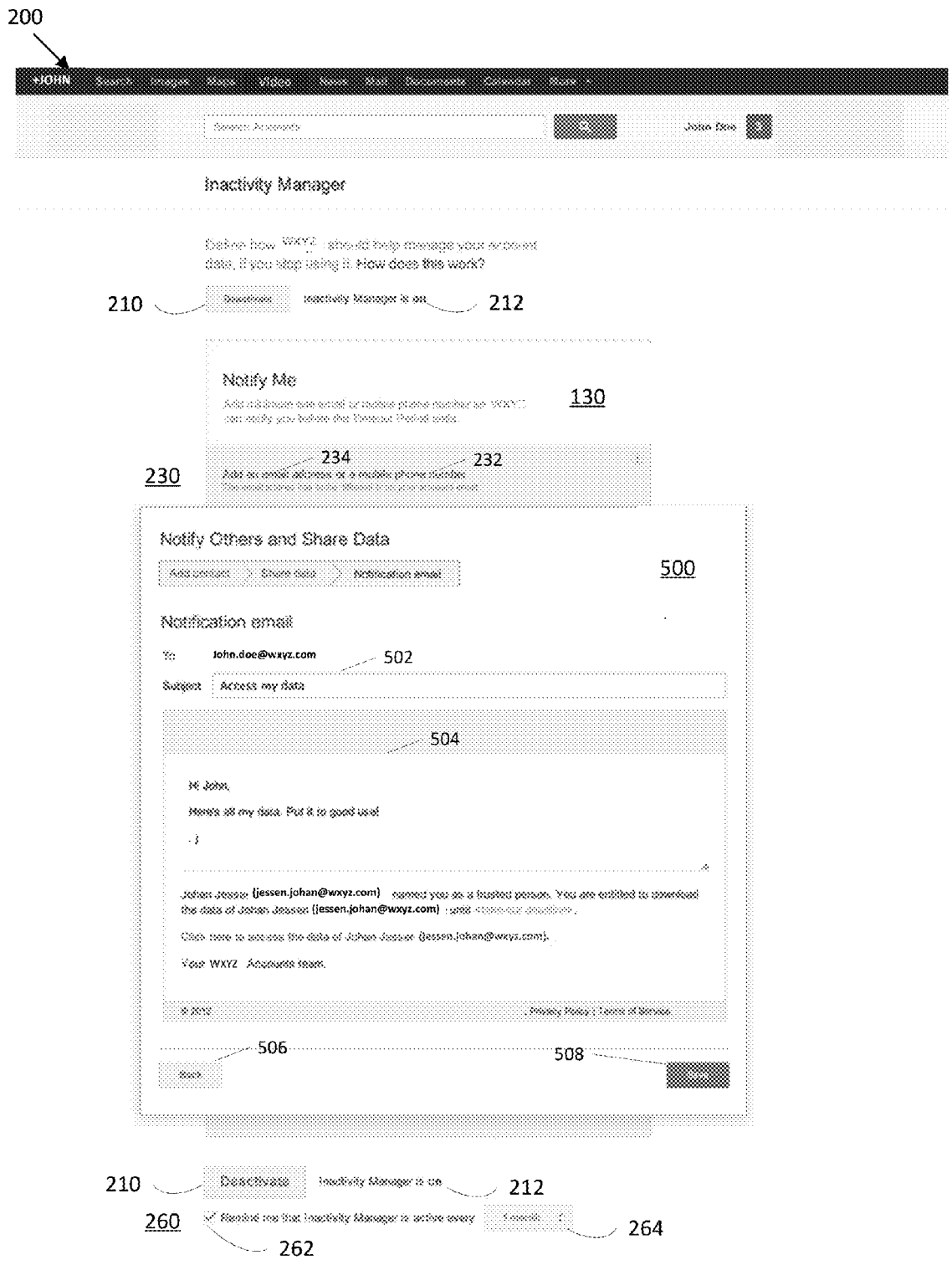

FIG. 7 illustrates the user interface 200 with an email dialog box 500 displayed. After control 426 of UI 400 has been used to submit the selections of data, the email dialog 500 is displayed to allow the user to draft the email that will be sent to the identified "trusted contact". The email dialog 500 has a subject field 502, email body field 504, and controls 506, 508 to be used to draft the email. Control 504 may be used to allow a user to return to UI 400 and control 506 to save the email to be sent at a future time. For example, the user has indicated that "John Doe" should receive an email with a title "Access my data", and a body that is indicative that the recipient has been identified as a trusted person and the recipient is now entitled to download data. Additionally a link to access the transferred data may be provided. Additional information or actions may also be provided in some implementations.

Various aspects of the implementation have been discussed above with respect to FIGS. 1-7. However, implementations of the present application are not limited to the aspects shown in FIGS. 1-7. For example, UI 400 illustrates a checklist, but other equivalent interfaces as would be understood in the art may be substituted therefor, e.g., drop-down list or manual text entry field. Here, "Online Contacts" is the specified account data. Additionally, the specified person (i.e. "trusted contact") was shown has having an account with the service provider, but the specified person (e.g., "Jane Doe") may or may not have an account with the service provider. In some implementations, the specified person may be asked to create an account, if that is needed in an implementation, to access the specified account data.

Additionally, in some implementations the user interfaces 100 and 200 may also include includes a visual or graphical timeline. A visual or graphical timeline may show, for example, the inactivity duration, warning duration, and action duration visually. In some example implementations, a visual timeline may show other indicators (e.g., a mark may be shown for each month when a reminder email will be sent to the user). In some example implementations, the visual timeline may be a visual indicator that is shown differently (e.g., different location, size, color, etc.)

Further, in the implementation discussed above, the trigger event was a user's signing into the user's account, and the durations were measured from the user's last sign-in. However, alternative triggering events could be used. For example, a user may request a service provider to check a third-party database for the user (e.g., check a database of death certificates). This alternative may be implement by a setting or control provided in UI 100 or UI 200 that if activated cause the service provider to check a third-party database to identify the user as inactive. The service provider may check the database on demand, on a regular interval, or after the inactivity duration of, for example, six months has elapsed. If the database contains the user's name, the user's account is identified as inactive, setting off the inactive triggering event to take one or more actions defined in other parts of UI 200.

Checking of the third party database may be an alternative to or in addition to monitoring the time elapsed since a previous sign-in. For example, the user may indicate that a third party database will be checked for the status of the user if there has been no log into the account for 6 months. Additionally, in some implementations, email or some other warning could be sent to the user prior to searching the third party data base or if identifying information is found in the third party database prior to an action being taken by the service provider. For example, a user may indicate that an email should be sent two weeks prior to considering an account inactive since the last previous login and checking the third-party database or an email could be sent when the identifying information is found in the third party database. Of course any of the features or aspects of the implementations may be combined as would be understood by a person of ordinary skill in the art.

Figure 8:
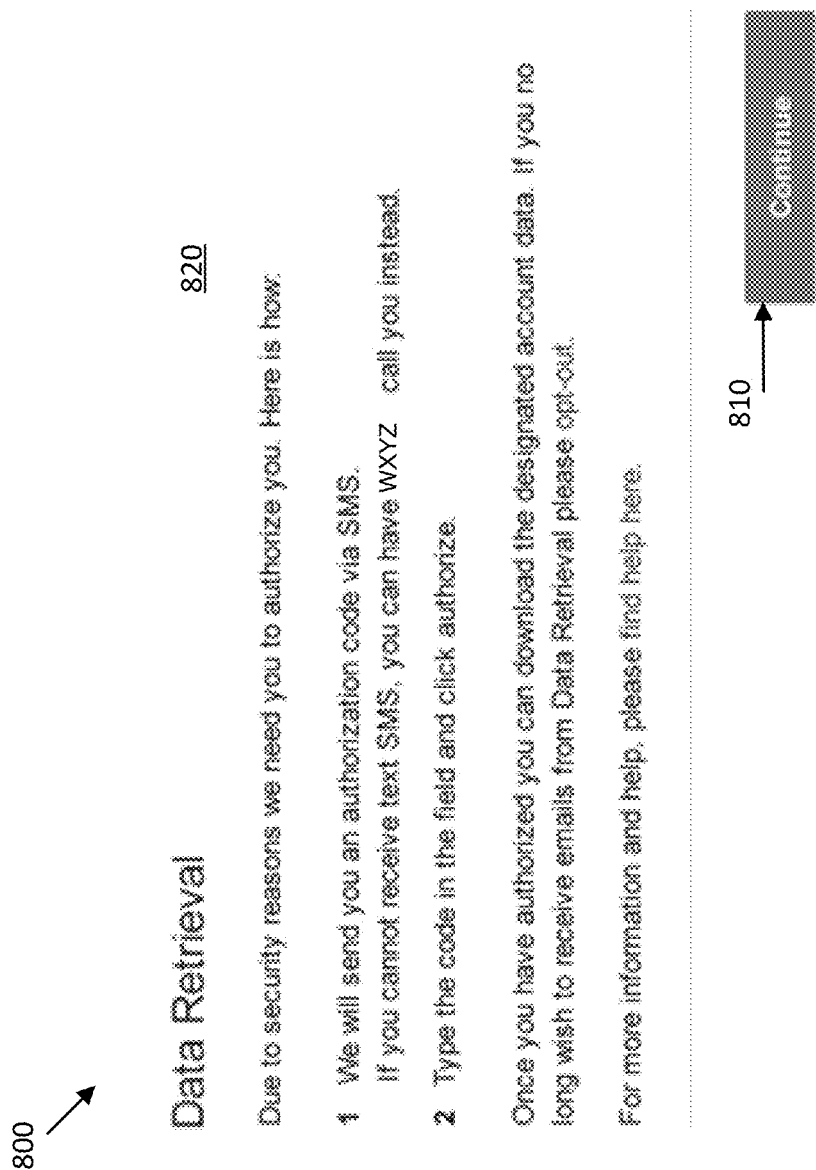

FIG. 8 illustrates a User Interface (UI) 800 that may be used to verify or authenticate the trusted contact after the triggering events discussed above have occurred and the specified duration of time has elapsed. The UI 800 includes a control 810 to proceed with the authentication or verification of the trusted contact and an indication section 820 explaining the authentication procedure to a trusted contact. In this implementation, the indication section 820 informs the trusted contact that an SMS message containing an authorization code will be sent to a phone number associated with the authenticated user and the user will be asked to type the authorization code into a user interface 900 discussed below. Additionally, the indication section 820 may also inform the trusted contact that a phone call may be used to receive the authorization code. The trusted contact has the option to ignore the authorization request and forfeit access to the shared data, or proceed with the authentication using the control 810.

Figure 9:
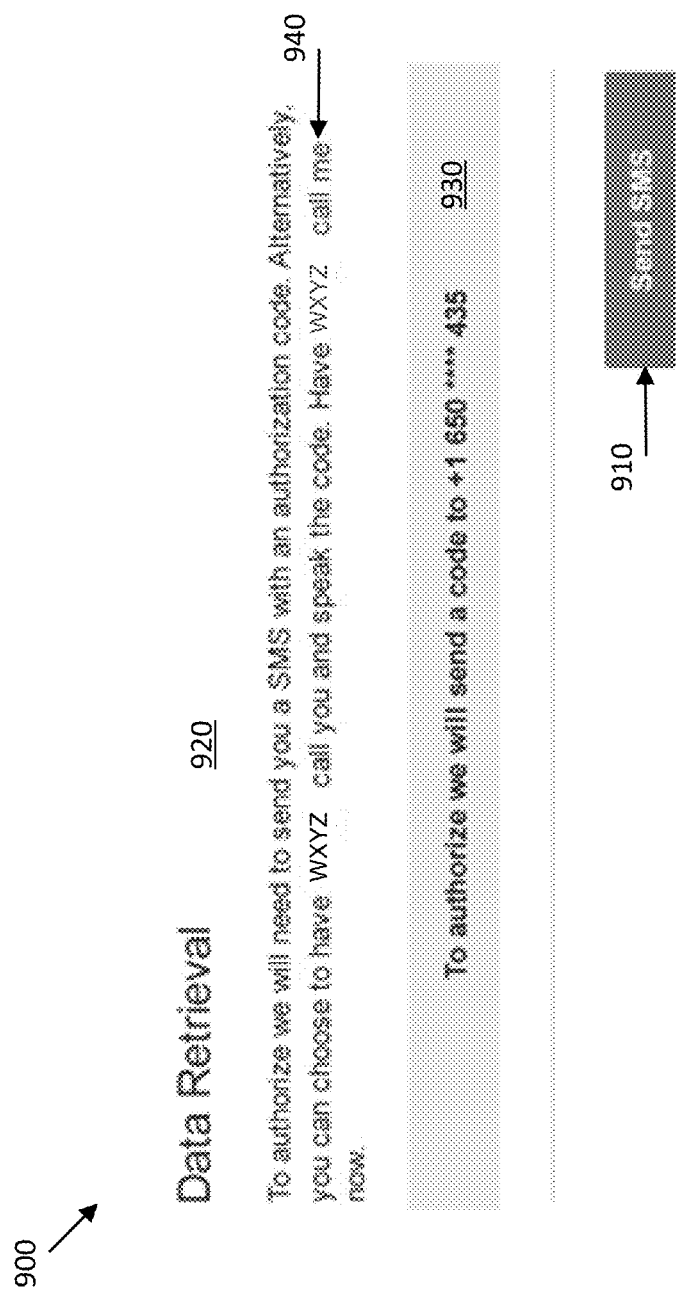
Figure 10:
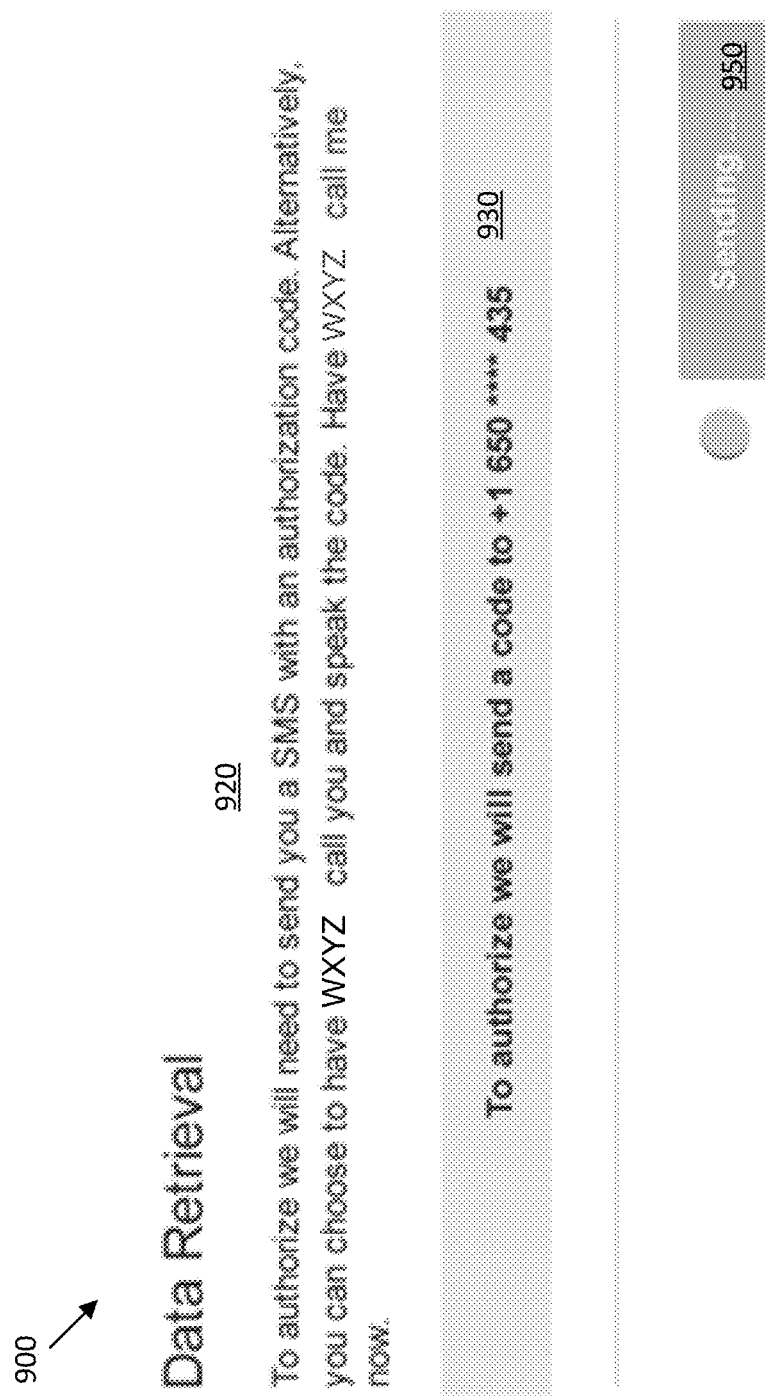

FIGS. 9 and 10 illustrate a User Interface (UI) 900 that is used to authenticate trusted contact if the trusted contact chooses to proceed using the control 810 of UI 800. The UI 900 includes a control 910 allowing the trusted contact to request an SMS message with an authorization code be sent and a control 940 allowing the trusted contact to request a telephone call having the code be spoken instead of the SMS message. Additionally, the UI 900 also includes an indication section 920 that informs the trusted contact that an authorization code will be sent via SMS or via a telephone call. Further, the UI 900 may also include an indication section 930 indicating the at least a portion of the telephone contact number to which the authorization code will be sent. After the trusted contact has selected one of the controls 910 and 940 to determine how the authorization code should be sent, the control 910 may become an indicator 950 (shown in FIG. 10) indicating that the authorization code is being transmitted.

Figure 11:
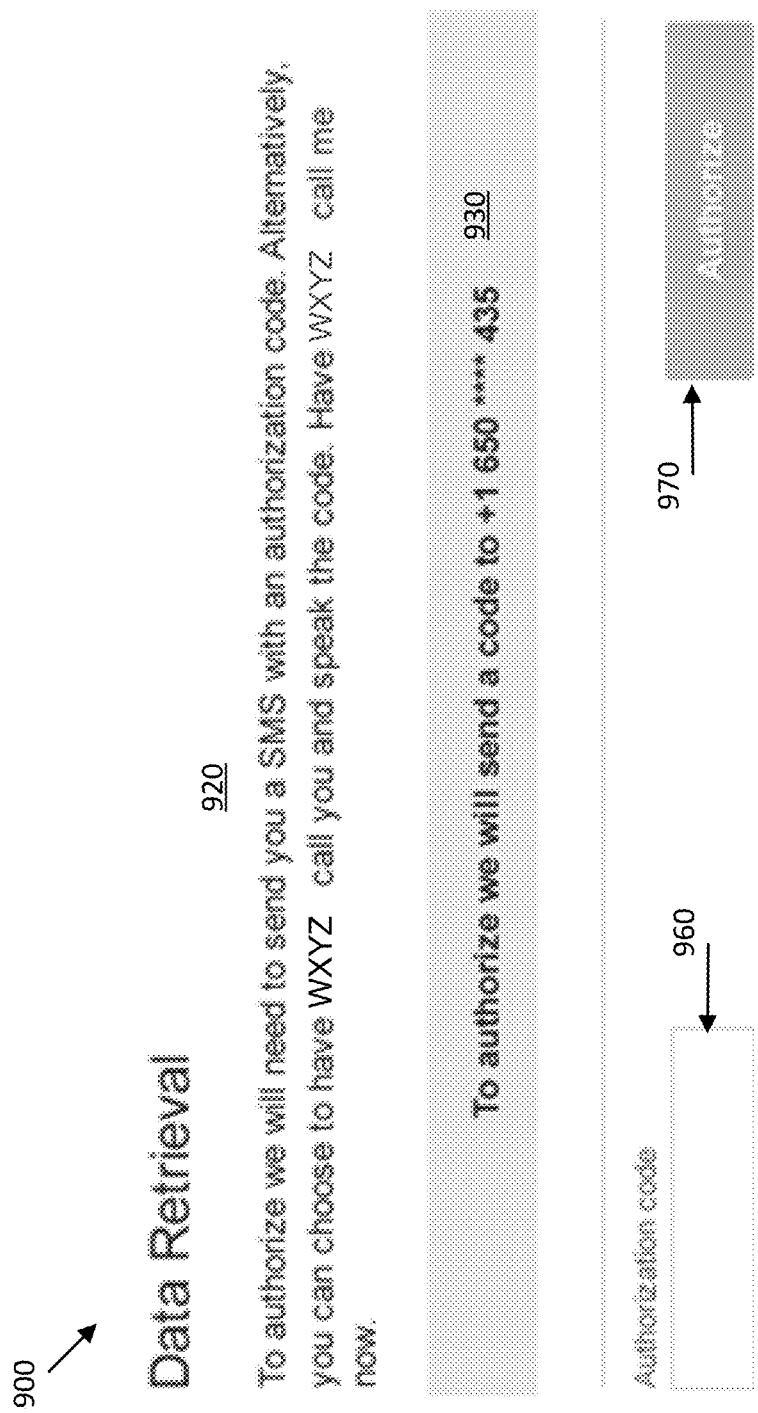
Figure 12:
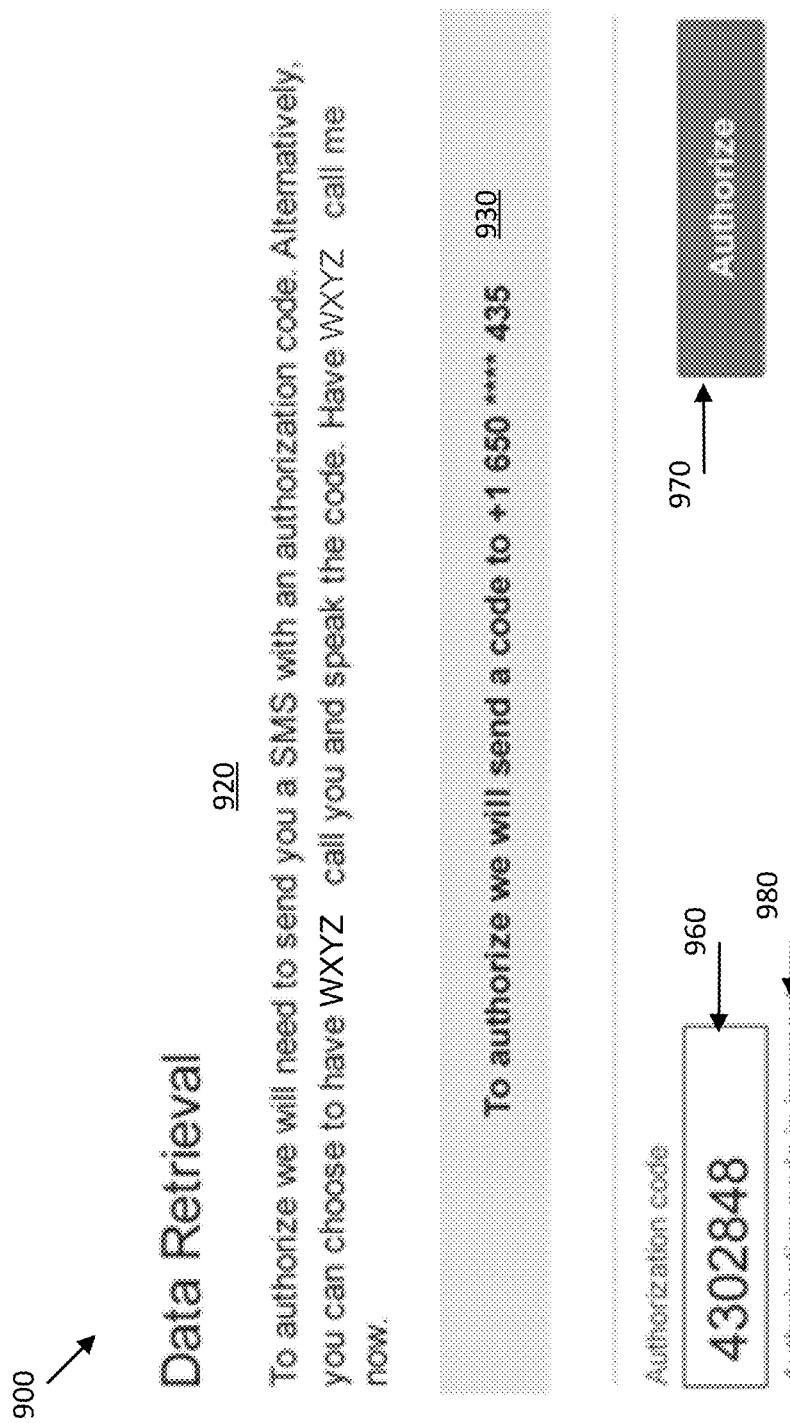
Figure 13:
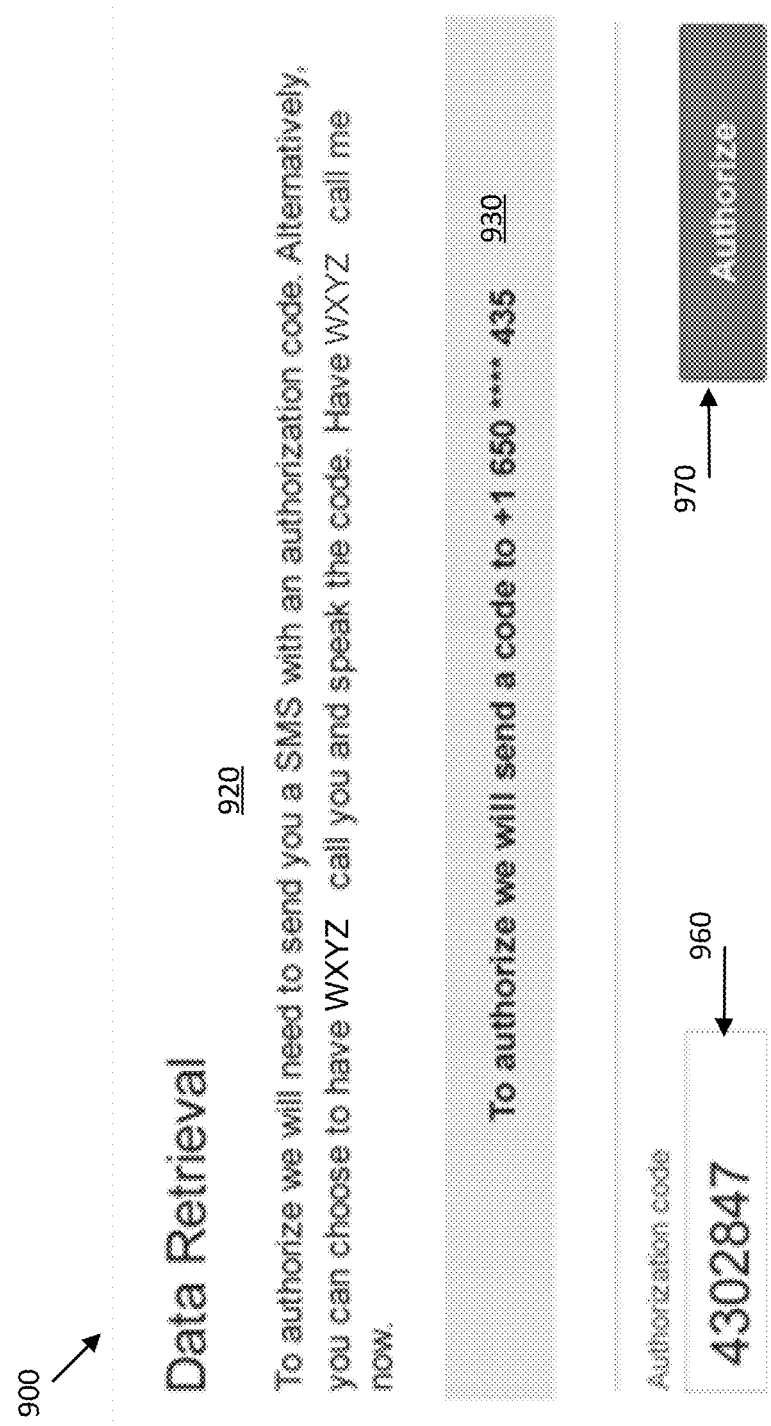

FIGS. 11-13 illustrate the UI 900 after the authorization code has been sent to the trusted contact. After the authorization code has been sent to the trusted contact, the UI 900 alters to include a text entry field 960 to allow the trusted contact to enter the sent authorization code and a control 970 that can be used to authorize access to the shared data. In some implementations, the control 970 may be greyed out or rendered unusable until a correct authorization code is entered in the text entry field 960 as shown in FIG. 11. Further, in some implementations, the UI 900 may also include an indicator 980 that is displayed when an incorrect authorization code is entered into the text entry field as shown in FIG. 12. Further, as shown in FIG. 13, the control 970 may become active when the correct authorization code has been entered into the text entry field 960. The trusted contact may than use the control 970 to access the shared data using a User Interface (UI), such as UI 1400 shown in FIG. 14.

FIG. 14 illustrates a UI 1400 used by the trusted contact to access the shared data after the trusted contact has been authorized using UI 900. The UI 1400 includes an indicator section 1410 informing the trusted contact the type of data and the amount of data that has been shared, and a download section 1420 providing a plurality of links 1430 that can be used to download and access the shared data.

Figure 15:
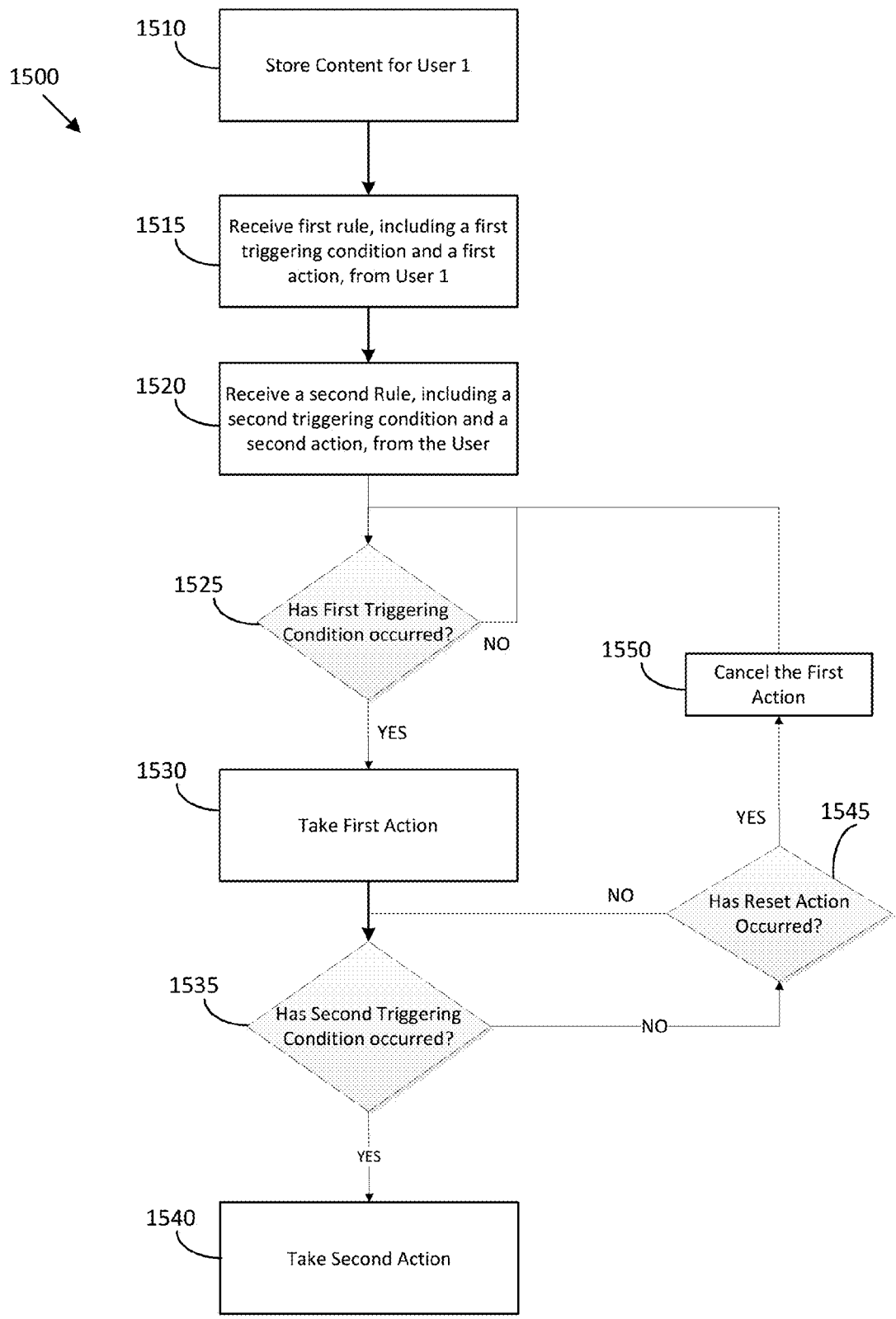
FIGS. 15-17 are flowcharts of example methods according to some example implementations.

FIG. 15 is a flowchart of an example method (process 1500) according to at least one example implementation. Content (e.g., accounts and/or data) for a user is stored (operation 1510). A first rule with one or more triggering conditions and one or more actions is received from the user (operation 1515). For example, the user may use UI 100 (FIG. 1) and UI 200 (FIG. 2) to specify or define the rule with one or more triggering conditions and actions. A second rule with one or more triggering conditions and one or more actions may be received from the user (operation 1520). In some example implementations, there may be one rule with two or more triggering conditions and/or two or more actions.

If a first triggering condition (e.g., defined in the first rule) has not occurred, at operation 1525, wait for that or another triggering condition. If the first triggering condition has occurred, at operation 1525, take a first action (operation 1530). If a second triggering condition (e.g., defined in the second rule) has occurred, at operation 1535, take a second action (operation 1540). If the second triggering condition has not occurred, at operation 1535, determine whether a reset action has occurred (operation 1545).

A reset action is any action that has canceled or negated a triggering condition. Different triggering conditions have different reset actions. For example, a reset action to an inactive triggering condition may be an activity or active condition of an account (i.e., a login to an account resets the triggering condition of an inactive period of the account). If the answer at operation 1545 is no, process 1500 flows back to operation 1535. If the answer at operation 1545 is yes, cancel the first action (operation 1550, i.e., notifying the user (e.g., by email) that the triggering condition has been canceled). Process 1500 flows back to operation 1525. In some examples, process 1500 may be implemented with different, fewer, or more operations. Process 1500 may be stored as instructions on a medium, loaded onto one or processors of one or more computing devices, and executed as a computer-implemented method.

Figure 16:
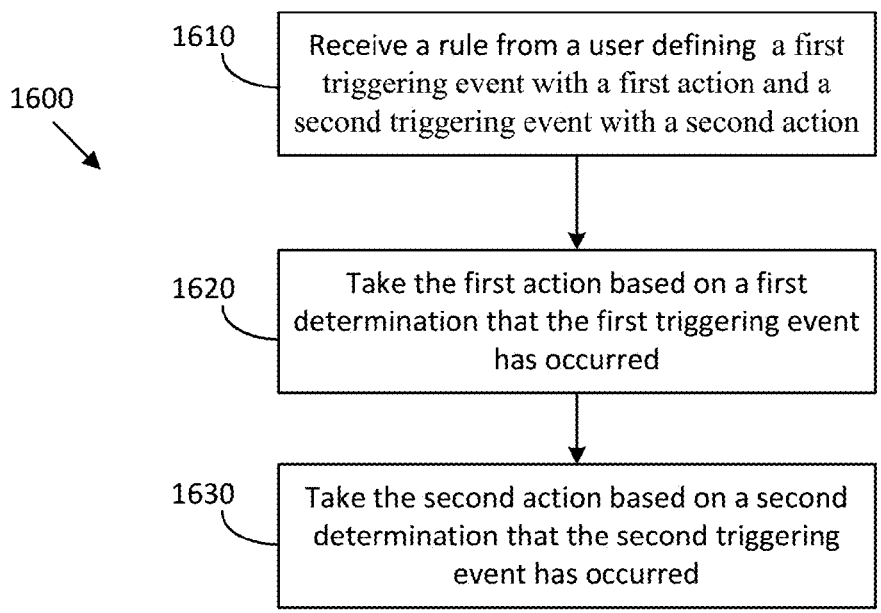

FIG. 16 is a flowchart of another example method (process 1600) according to at least one example implementation. A rule is received from a user having access to an account that contains content of the user (operation 1610). The rule, which may be defined by the user, specifies or defines a first triggering event associated with a first action and a second triggering event associated with a second action. The first action is taken based on a determination that the first triggering event has occurred (operation 1620). The second action is taken based on another determination that the second triggering event has occurred (operation 1630). In some examples, process 1600 may be implemented with different, fewer, or more operations. Process 1600 may be stored as instructions on a medium, loaded onto one or processors of one or more computing devices, and executed as a computer-implemented method.

Figure 17:
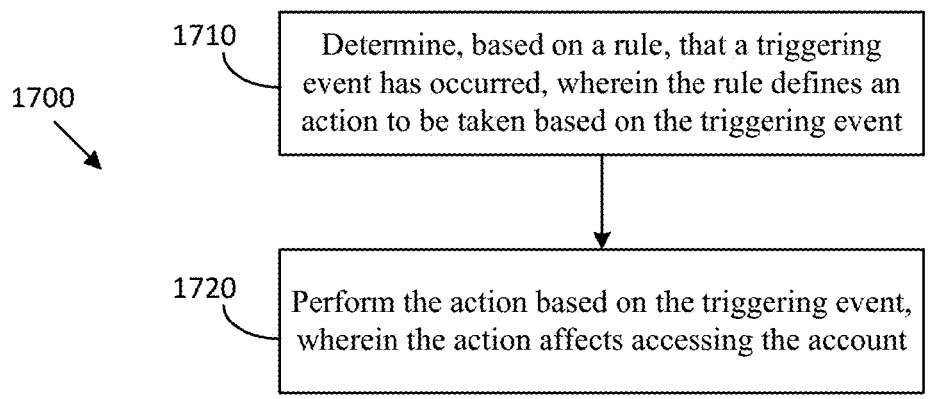

FIG. 17 is a flowchart of yet another example method (process 1700) according to at least one example implementation. It is determined, based on a user-defined rule, that a triggering event has occurred (operation 1710). The user-defined rule is associated with an account that belongs to the user, and the user-defined rule includes an action to be taken based on the triggering event. The action based on the triggering event is performed (operation 1720). The action affects access to the account. For example, the account may be transferred, locked, or deleted. In some examples, process 1700 may be implemented with different, fewer, or more operations. Process 1700 may be stored as instructions on a medium, loaded onto one or processors of one or more computing devices, and executed as a computer-implemented method.

Figure 18:
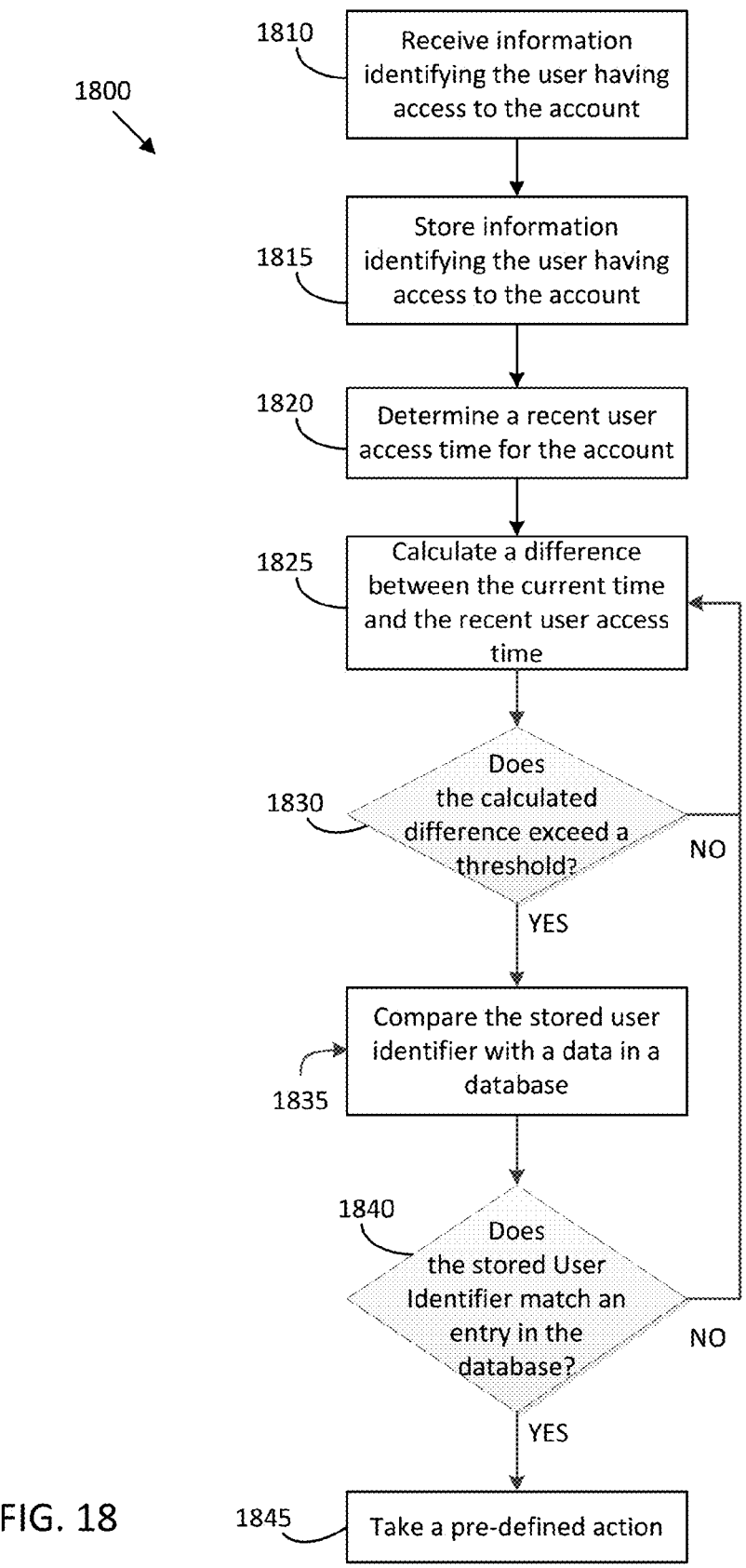
FIG. 18 is another flowchart of a method according to at least one example implementation.

FIG. 18 is another flowchart of a method (process 1800) according to at least one example implementation. Information identifying the user who has access to one or more accounts is received (operation 1810). The information may include user identifying information (e.g., name, address, telephone number, etc.) and user account information (e.g., a user identifier). The received information is stored (operation 1815). A recent user access time for one or more of the user's accounts is determined (operation 1820). A difference between the current time and the recent user access time is calculated (operation 1825). For example, the user recently accessed his or her account on a date six months and one day ago. The difference between that date and the current time is determined or calculated to be six months and one day.

A comparison is made to determine whether the calculated difference exceeds a threshold (operation 1830). If the answer is no, process 1800 flows back to operation 1825. If the answer is yes, for example, the threshold is six months (e.g., the inactivity duration 122 specified in UI 100, FIG. 1), the difference of six months and one day exceeds the threshold. The stored information identifying the user (e.g., including a user identifier) is compared with a database (operation 1835). The database can be a third-party database (e.g., prison incarceration records, social security death registries, obituary databases, a death announcement database of a newspaper, government death records, etc.). If the database contains the user identifier (i.e., the stored user identifier matches an entry in the database, operation 1840), then a pre-defined action is taken (operation 1845).

Note that the pre-defined action is taken based on both determinations at operations 1830 and 1840. In some example implementations, there may be a waiting period between the first and second determination or between the second determination and taking the pre-defined action. The pre-defined action may be restricting access to the user account and/or determining a status of the user or the account. The pre-defined action may be, for example, an action specified in action section 240 or final action section 250 of UI 200, FIG. 2. If, however, the answer in operation 1840 is no, process 1800 flows back to operation 1825. In some examples, process 1800 may be implemented with different, fewer, or more operations. Process 1800 may be stored as instructions on a medium, loaded onto one or processors of one or more computing devices, and executed as a computer-implemented method.

Example Computing Device and Environment

Figure 19:
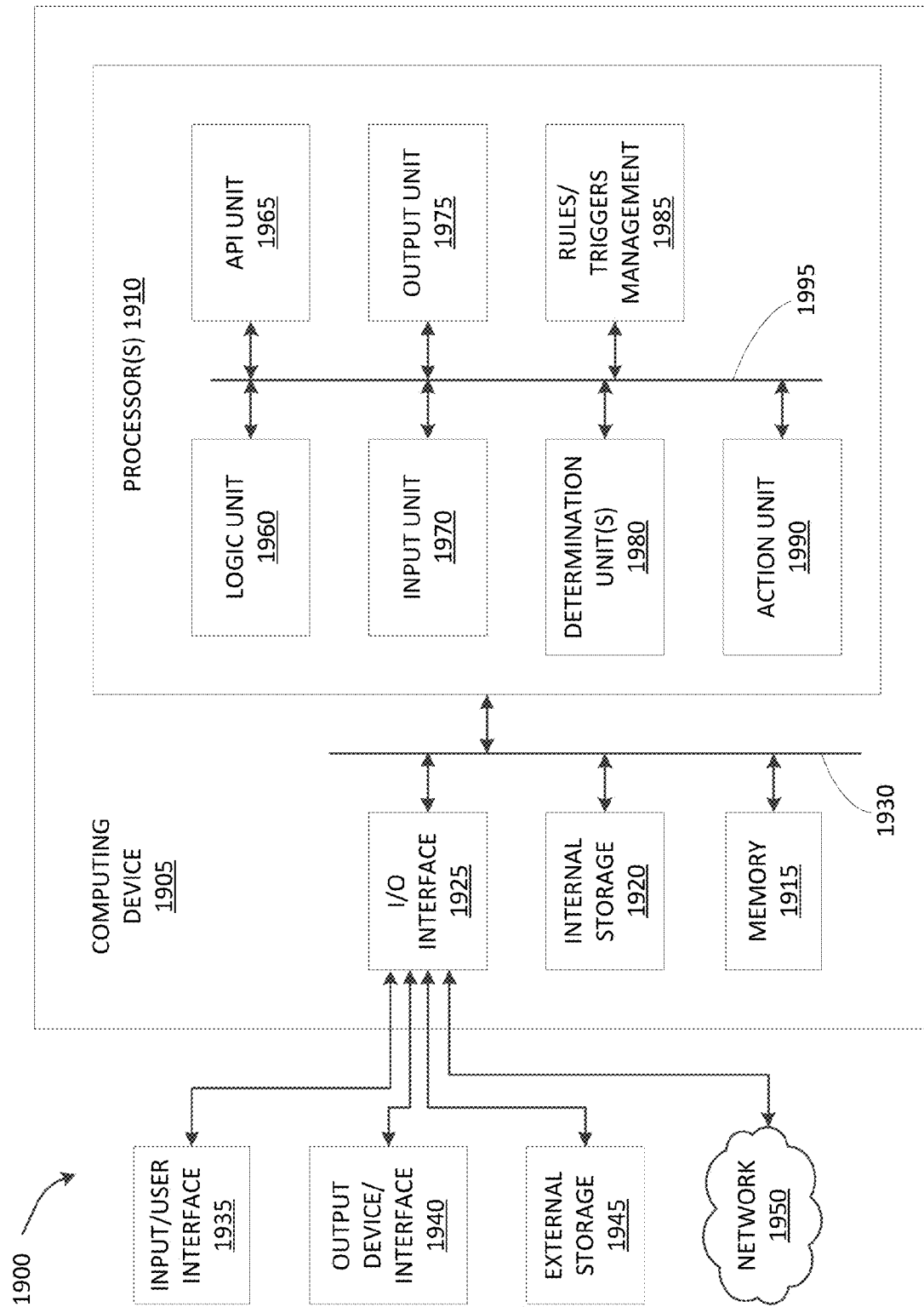
FIG. 19 shows an example computing environment with an example computing device suitable for implementing at least one example implementation.

FIG. 19 shows an example computing environment with an example computing device suitable for implementing at least one example implementation. Computing device 1905 in computing environment 1900 can include one or more processing units, cores, or processors 1910, memory 1915 (e.g., RAM or ROM), internal storage 1920 (e.g., magnetic, optical, or solid state storage), and I/O interface 1925, all of which can be coupled on a communication mechanism or bus 1930 for communicating information.

Computing device 1905 can be communicatively coupled to input/user interface 1935 and output device/interface 1940. Either one or both of input/user interface 1935 and output device/interface 1940 can be a wired or wireless interface and can be detachable. Input/user interface 1935 may include any device, component, sensor, or interface, physical or virtual that can be used to provide input (e.g., keyboard, a pointing/cursor control, microphone, camera, braille, motion sensor, optical reader, or the like). Output device/interface 1940 may include a display, monitor, printer, speaker, braille, or the like. In some example implementations, input/user interface 1935 and output device/interface 1940 can be embedded with or physically coupled to computing device 1905 (e.g., a mobile computing device with buttons or touch-screen input/user interface and an output or printing display, or a television).

Computing device 1905 can be communicatively coupled to external storage 1945 and network 1950 for communicating with any number of networked components, devices, and systems, including one or more computing devices of the same or different configuration. Computing device 1905 or any connected computing device can be functioning as, providing services of, or referred to as a server, client, thin server, general machine, special-purpose machine, or by other labels.

I/O interface 1925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and networks in computing environment 1900. Network 1950 can be any network or combination of networks (e.g., the Internet, local area network, wide area network, a telephonic network, a cellular network, satellite network, and the like).

Computing device 1905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1905 can be used to implement techniques, methods, applications, processes, or computer-executable instructions to implement at least one implementation (e.g., a described implementation). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 1910 can execute under any operating system (OS) (not shown), in a native or virtual environment. To implement a described implementation, one or more applications can be deployed that include logic unit 1960, application programming interface (API) unit 1965, input unit 1970, output unit 1975, determination unit(s) 1980, rules/triggers management unit 1985, action unit 1990, and inter-unit communication mechanism 1995 for the different units to communicate with each other, with the OS, and with other applications (not shown). For example, determination unit(s) 1980, rules/triggers management unit 1985, action unit 1990, along with one or more other units, may implement one or more processes shown in FIGS. 19-17 and 18. In some example implementations, determination unit(s) 1980 may include two or more separate units. The described units and elements can be varied in design, function, configuration, or implementation and are not limited to the descriptions provided.

In some example implementations, when information or an execution instruction is received by API unit 1965, it may be communicated to one or more other units (e.g., logic unit 1960, input unit 1970, output unit 1975, determination unit(s) 1980, rules/triggers management unit 1985, action unit 1990). For example, rules/triggers management unit 1985 may manage one or more rules, each of which may include one or more triggering events and/or associated actions. One or more rules, triggering events, and/or actions may be user defined.

Determination unit(s) 1980 may use API unit 1965 to retrieve a rule from rules/triggers management unit 1985. Determination unit(s) 1980 may determine that a triggering event has occurred and communicate to the action unit 1990. Action unit 1990 may use API unit 1965 to retrieve a rule and one or more corresponding actions from rules/triggers management unit 1985. Action unit 1990 may then implement the one or more actions.

In some examples, logic unit 1960 may be configured to control the information flow among the units and direct the services provided by API unit 1965, input unit 1970, output unit 1975, determination unit(s) 1980, rules/triggers management unit 1985, action unit 1990 in order to implement an implementation described above. For example, the flow of one or more processes or implementations may be controlled by logic unit 1960 alone or in conjunction with API unit 1965.

Although a few example implementations have been shown and described, these example implementations are provided to convey the subject matter described herein to people who are familiar with this field. It should be understood that the subject matter described herein may be embodied in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method to enable a first user to control access to user information that includes user data selected from a one or more categories of online user data, the computer-implemented method comprising:
providing the first user with an option to associate a second user with an account of the first user, based on a user-defined rule associated with the account of a first user, that a first triggering event associated with a first action has occurred, the first triggering event comprising an amount of time elapsing after a first login to the account of the first user without a second login to the account, during which the first user does not respond to an online status inquiry after the first login to the account, and that a second triggering event is associated with a second action, wherein, the user-defined rule comprises the first action to be performed based on the first triggering event, the user-defined rule including at least determining the user information to be provided to the second user based on a category of the user information, and the user-defined rule is generated by the first user prior to the online status inquiry;
based on the first triggering event, performing the first action, which comprises providing the second user with an online notification associated with the account of the first user, wherein the second user is informed of the first user associating the second user with the account of the first user after the performing the first action, and the second user is determined by the first user prior to the first triggering event, prior to informing and prior to providing the second user with the online notification prior to the first triggering event, the first action and the second action; and
performing the second action based on a second determination that the first triggering event and the second triggering event have occurred.

2. The computer-implemented method of claim 1, the providing the first user with the option further comprising providing the first user with an option for the second action to include deleting the account of the first user.

3. The computer-implemented method of claim 1, the providing the first user with the option comprising providing the first user with an option to provide the second user with online access to the user information associated with the account of the first user, the second user not having the online access prior to the providing the second user with the online access.

4. The computer-implemented method of claim 3, wherein the first action comprises providing the second user with online access to user information associated with the account of the first user, the second user not having online access prior to the providing the second user with the online access.

5. The computer-implemented method of claim 1, wherein the second action comprises deleting the account of the first user.

6. The computer-implemented method of claim 1, wherein second triggering event is sending a communication to the second user.

7. A non-transitory computer readable medium having stored therein computer executable instructions for enabling a first user to control access to user information that includes user data selected from a one or more categories of online user data, the instructions comprising:
based on providing the first user with an option to associate a second user with an account of the first user, receiving a rule associated with the account of the first user from the first user having online access to an account belonging to the first user that contains content of the first user, wherein the rule defines a first triggering event associated with a first action, the first triggering event comprising an amount of time elapsing after a first login to the account of the first user without a second login to the account, during which the first user does not respond to an online status inquiry after the first login to the account, associated with a first action, and a second triggering event associated with a second action, wherein, the rule comprises an action to be performed based on the first triggering event, the user-defined rule including at least determining the user information to be provided to the second user based on a category of the user information, and the rule is generated by the first user prior to the online status inquiry;
based on the first triggering event, performing the first action, which comprises providing the second user with an online notification associated with the account of the first user, wherein the second user is informed of the first user associated the second user with the account of the first user after the performing the first action, and the second user is determined by the first user prior to the first triggering event, prior to informing and prior to providing the second user with the online notification prior to the first triggering event, the first action, and the second action; and
performing the second action based on a second determination that the first triggering event and the second triggering event have occurred.

8. The non-transitory computer readable medium of claim 7, wherein the second user is provided with the online notification after the performing the first action and the second action.

9. The non-transitory computer readable medium of claim 7, the providing further comprising providing the first user with an option for the second action to include deleting the account of the first user.

10. At least one computing device comprising storage and at least one processor configured to:
based on providing the first user with an option to associate a second user with an account of the first user, receive a rule associated with the account of the first user from the first user having online access to an account belonging to the first user that contains content of the first user, wherein the rule defines a first triggering event associated with a first action, the first triggering event comprising an amount of time elapsing after a first login to the account of the first user without a second login to the account, during which the first user does not respond to an online status inquiry after the first login to the account, associated with a first action and a second triggering event associated with a second action, wherein, the rule comprises an action to be performed based on the first triggering event, the user-defined rule including at least determining user information that includes user data selected from a one or more categories of online user data, to be provided to the second user based on a category of the user information, and the rule is generated by the first user prior to the online status inquiry;

based on the first triggering event, perform the first action which comprises providing the second user with an online notification associated with the account of the first user, wherein the second user is informed of the first user associating the second user with the account of the first user after the performing the first action; and wherein the second user is determined by the first user prior to the first triggering event, prior to informing and prior to providing the second user with the online notification prior to the first triggering event, the first action, and the second action; and perform the second action based on a second determination that the first triggering event and the second triggering event have occurred.

11. The at least one computing device of claim 10, wherein the second user is provided with the online notification after the performing the first action and the second action.

12. The at least one computing device of claim 10, providing the providing further comprising providing the first user with an option for the second action to include deleting the account of the first user.

13. The at least one computing device of claim 10, the providing comprising providing the first user with an option to provide the second user with online access to the user information associated with the account of the first user, the second user not having the online access prior to the providing the second user with the online access.

14. A non-transitory computer readable medium having stored therein computer executable instructions for:

maintaining an account, the account being accessible by a first user, and storing a user identifier of the first user in a storage;

performing a first determination by a processor that a difference between a current time and a recent user access time of the account exceeds a threshold value, during which the first user does not respond to an online status inquiry after the first login to the account;

performing a second determination by the processor that the stored user identifier matches a third-party database entry indicative of the first user not being capable of accessing user information in the account, the user information including user data selected from a one or more categories of online user data; and performing a first action by the processor, based on the first determination and the second determination, the first action comprising providing the first user with an option to provide the second user with online access to user information associated with the account of the first user, the second user not having the online access prior to the providing the second user with the online access, and wherein the user information comprises user data selected by the first user from one or more categories of online user data, and providing the second user with an online notification associated with the account of the first user, wherein the second user is provided with the online notification after the providing the second user with the online notification being associated with the account of the first user, after a waiting period, performing a second action, wherein the second user is determined by the first user prior to the first determination and the second determination, prior to informing and providing the second user with the online notification, and prior to the first determination and the second determination.

15. The non-transitory computer readable medium of claim 14, wherein the second user is provided with the online notification after the performing the first action and the second action.

16. The non-transitory computer readable medium of claim 14, the first action further comprising providing the first user with the option for the second action to include deleting the account of the first user.

17. The non-transitory computer readable medium of claim 14, wherein the second action comprises deleting the account of the first user.

* * * * *